United States Patent

Thomas

[11] 3,864,339
[45] Feb. 4, 1975

[54] SUBSTITUTED 1 H-OXAZOLO(4,3-C)(1,4)THIAZINIUM

[75] Inventor: Robert Thomas, Guildford, England

[73] Assignee: E. R. Squibb & Sons, Inc., Princeton, N.J.

[22] Filed: Sept. 28, 1973

[21] Appl. No.: 401,797

[30] Foreign Application Priority Data
Jan. 3, 1973 Great Britain.......................... 410/73

[52] U.S. Cl.............................. 260/243 R, 424/246
[51] Int. Cl............................................. C07d 93/10
[58] Field of Search ................................ 260/243 R

[56] References Cited
UNITED STATES PATENTS
3,534,029  10/1970  Beyerman............................. 260/243

Primary Examiner—John M. Ford
Attorney, Agent, or Firm—Lawrence S. Levinson; Merle J. Smith

[57] ABSTRACT

Substituted 1H-oxazolo[4,3-c][1,4]thiazinium halides of the general formula

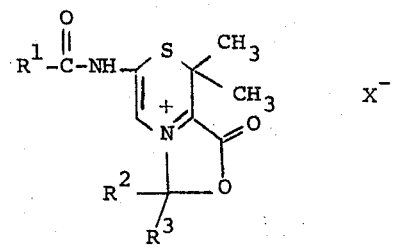

are obtained from penicillin derivatives and are useful in producing antibacterial agents.

6 Claims, No Drawings

SUBSTITUTED 1 H-OXAZOLO(4,3-C)(1,4)THIAZINIUM

SUMMARY OF THE INVENTION

This invention relates to substituted 1H-oxazolo-[4,3-c][1,4]thiazinium halides of the formula

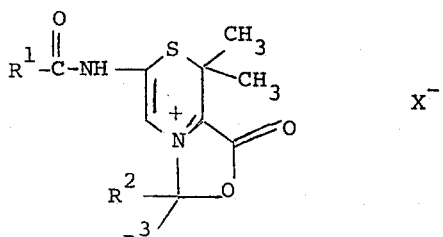

$R_1$ is lower alkyl, phenyl, substituted phenyl, benzyl, substituted benzyl, phenoxymethyl, cyclohexadienyl, cyclohexadienylmethyl, thienyl, furyl, pyridyl, thienylmethyl, furylmethyl or pyridylmethyl.

$R_2$ and $R_3$ each is lower alkyl or phenyl.

X is a halogen, preferably chlorine or bromine.

The compounds of this invention are obtained by treating a penicillin sulfoxide with a ketone in the presence of an acyl halide. When these products are treated with an aqueous organic solvent such as acetone or chloroform, they yield a product which is an antibacterial agent, inhibiting microorganisms such as *Bacillus subtilis* and *Salmonella typhimurim*.

DETAILED DESCRIPTION OF THE INVENTION

In the compounds of the invention described above in formula I, the lower alkyl groups are straight or branched chain hydrocarbon groups of one to seven carbon atoms, for example, methyl, ethyl, propyl, isopropyl, butyl, isobutyl, t-butyl and the like.

The substituted phenyl groups are phenyl groups containing a halo or lower alkyl group, i.e., $R^4$-phenyl wherein $R^4$ is halogen or lower alkyl.

The substituted benzyl groups represented by $R^1$ are those bearing a substituent on the phenyl ring or on the α-carbon, the substituents on the phenyl ring being lower alkoxy (e.g., methoxy, ethoxy, propoxy and the like), hydroxy, halo or lower alkyl and those on the carbon being amino, carboxy, halo or lower alkoxy. The substituted benzyl group is then

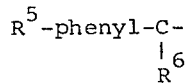

wherein $R^5$ is hydrogen, halo, hydroxy, lower alkoxy or lower alkyl and $R^6$ is hydrogen, amino, halo, carboxy or lower alkoxy. Preferably only one of $R^5$ and $R^6$ is other than hydrogen.

In all lower alkyl or lower alkyl-containing groups, the 1 to 3 carbon members are preferred.

All four common halogens are represented by the symbols, but in each instance, chlorine and bromine are preferred.

The cyclohexadienyl and cyclohexadienylmethyl groups include preferably the 1,4-cylohexadienyl radi-cal. In the heteromethyl group the heterocyclic is preferably attached at the 2- or 3-position, especially the 2-position.

A preferred group are those wherein $R^1$ is phenyl, benzyl, α-carboxybenzyl or phenoxymethyl, $R^2$ and $R^3$ each is lower alkyl of one to three carbons, especially methyl, and X is chlorine or bromine, especially chlorine.

The compounds of this invention are derived from penicillin sulfoxides of the formula (II)

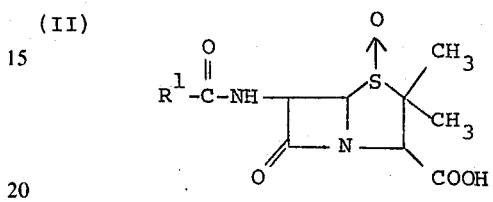

wherein $R^1$ has the meaning defined above. These sulfoxides are known compounds obtained by oxidation of penicillins by methods well known to the art such as reaction of a penicillin in aqueous or alcoholic solution with metachloroperbenzoic acid or sodium periodate. It is the betasulfoxide which undergoes this transformation.

The penicillin sulfoxide of formula II is treated with an excess proportion of ketone, e.g., about 3 to 7 moles of ketone per mol. of penicillin sulfoxide, and about an equimolar proportion of an acyl halide.

The ketone has the formula

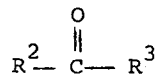

wherein $R^2$ and $R^3$ have the meanings defined above. Examples are di-lower alkyl ketones such as acetone, which is preferred, methyl ethyl ketone, acetophenone, benzophenone and the like.

Any acyl halide may be used, particularly those with the formula RCOX wherein R is lower alkyl, phenyl, phenyllower alkyl or the like and X is halide, preferably chlorine or bromine. Phenacetyl chloride is preferred. If one of the reactants is a liquid, as acetone for example, the other reactants can be dissolved or suspended in that medium. Otherwise an inert organic solvent such as chloroform, ether, benzene, dioxane, methylene chloride or the like can be used as the reaction medium.

When $R^1$ is a benzyl group wherein $R^6$ is amino, the amino group is best protected in a conventional manner before the reaction is undertaken.

The reaction occurs in the presence of oxygen at ambient temperature. For example, permitting the reaction mixture to stand at room temperature in the open air is generally sufficient and the product crystallizes out of solution. Generally about 1 to 3 hours are sufficient. Stirring and slight heating, e.g., up to about 60°C., may be utilized to accelerate the reaction, but this is not required.

The product of this reaction is generally a highly colored crystalline material which is separated from the reaction mixture by conventional techniques, e.g., filtering and drying.

When this product is dissolved in an aqueous inert organic solvent solution such as acetone or dioxane at about pH7, and permitted to stand for a while (overnight for example), a new product is formed, evidently by degradation, which upon bioautography shows activity as an antibacterial agent, e.g., inhibiting such organisms as *Bacillus subtilis* and *Salmonella typhimurium* at about 62 to 250 γ/ml.

The following examples are illustrative of the invention. All temperatures are on the centigrade scale. Other variations are made in the same manner by substituting another ketone and acyl halide for the ketones and acyl halides in the examples and using them to treat other penicillin sulfoxides.

EXAMPLE 1

100 mg. of penicillin V β-sulfoxide and 100 mg. of phenacetyl chloride are dissolved in 3 ml. of acetone in a flask open to the air. The reaction mixture is stirred for two hours at room temperature. After this time, an orange crystalline precipitate forms. The precipitate is filtered off and dried over phosphorus pentoxide. The product, 3,8-dihydro-3,3,8,8-tetramethyl-1-oxo-6-(2-phenoxyacetamido)-1H-oxazolo[4,3-c][1,4]thiazinium chloride, is obtained in 30 percent yield, m.p. 192°–194° (dec.).

EXAMPLE 2

By substituting benzylpenicillin β-sulfoxide for the penicillin V β-sulfoxide in the procedure of Example 1, 3,8-dihydro-3,3,8,8tetramethyl-1-oxo-6-(2-phenylacetamido)-1H-oxazolo[4,3-c][1,4]thiazinium chloride, is obtained.

EXAMPLE 3

By substituting α-carboxybenzylpenicillin β-sulfoxide for the penicillin V β-sulfoxide in the procedure of Example 1, 3,8-dihydro-3,3,8,8-tetramethyl-1-oxo-6-(2-carboxy-2-phenylacetamido)-1H-oxazolo[4,3-c][1,4]thiazinium chloride is obtained.

EXAMPLE 4

By substituting acetophenone for the acetone and phenacetyl bromide for the phenacetyl chloride in the procedure of Example 1, 3,8-dihydro-3,3,8,8-tetramethyl-3-phenyl-1-oxo-6-(2-phenoxyacetamido)-1H-oxazolo[4,3-c][1,4]-thiazinium bromide is obtained.

The following additional products are obtained by the procedure of Example 1 by substituting for the starting materials those substances having the same substituents indicated in the table for the products:

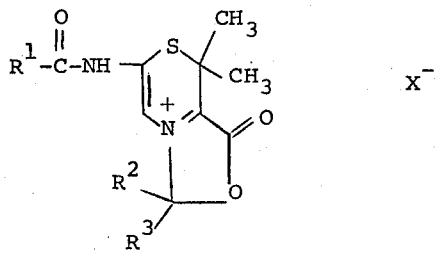

| Example | $R^1$ | $R^2$ | $R^3$ | X |
|---|---|---|---|---|
| 5 | $C_2H_5$ | $C_2H_5$ | $CH_3$ | Cl |
| 6 | $C_6H_5$ | $CH_3$ | $C_6H_5$ | Cl |
| 7 | (2-thienyl) | $CH_3$ | $CH_3$ | Cl |
| 8 | (2-furyl) | $C_2H_5$ | $C_2H_5$ | Cl |
| 9 | (2-pyridyl) | $CH_3$ | $CH_3$ | Cl |
| 10 | $CH_3$-C$_6$H$_4$- | $CH_3$ | $CH_3$ | Br |
| 11 | Cl-C$_6$H$_4$- | $CH_3$ | $CH_3$ | Cl |
| 12 | Br-C$_6$H$_4$- | $CH_3$ | $CH_3$ | Cl |

| Example | R¹ | R² | R³ | X |
|---|---|---|---|---|
| 13 | HO-C₆H₄-CH(OCH₃)- | CH₃ | CH₃ | Cl |
| 14 | C₂H₅-C₆H₄-CH(COOH)- | CH₃ | CH₃ | Cl |
| 15 | C₆H₅-CH(NH₂)- | C₆H₅ | C₆H₅ | Cl |
| 16 | HO-C₆H₄-CH₂- | CH₃ | CH₃ | Br |
| 17 | Cl-C₆H₄-CH₂- | CH₃ | CH₃ | Cl |
| 18 | CH₃O-C₆H₄-CH₂- | CH₃ | CH₃ | Cl |
| 19 | C₆H₅-CH(Cl)- | CH₃ | CH₃ | Cl |
| 20 | C₆H₅- | C₂H₅ | C₂H₅ | Cl |
| 21 | C₆H₅-CH₂- (cyclohexadienyl) | CH₃ | CH₃ | Br |
| 22 | 2-thienyl-CH₂- | CH₃ | CH₃ | Cl |
| 23 | 2-furyl-CH₂- | CH₃ | CH₃ | Cl |
| 24 | 2-pyridyl-CH₂- | CH₃ | CH₃ | Cl |

EXAMPLE 25

The product of Example 1 is dissolved in aqueous acetone and permitted to stand overnight. This material is then bioautographed. In tube dilution assays with *Bacillus subtilis* and *Salmonella typhimurium* growing in nutrient broth at pH7 at 37°, both bacteria are inhibited at 250 γ/ml.

What is claimed is:

1. A compound of the formula

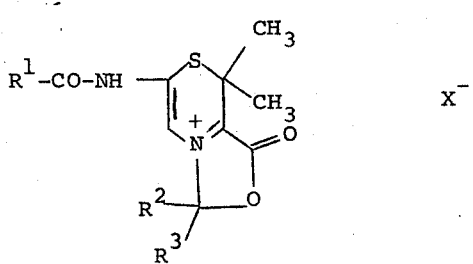

wherein $R^1$ is lower alkyl,
$R^4$-phenyl,

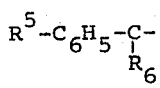

phenoxymethyl, thienyl, furyl, pyridyl, cyclohexadienyl, cyclohexadienylmethyl, thienylmethyl, furylmethyl, pyridylmethyl;

$R^2$ and $R^3$ each is lower alkyl or phenyl;

$R^4$ is hydrogen, halogen or lower alkyl;

$R^5$ is hydrogen, halo, hydroxy, lower alkoxy or lower alkyl;

$R^6$ is hydrogen, amino, halo, carboxy or lower alkoxy and X is halogen.

2. A compound as in claim 1 wherein $R^1$ is phenyl, benzyl, α-carboxybenzyl or phenoxymethyl, $R^2$ and $R^3$ each is lower alky of one to three carbons and X is chlorine or bromine.

3. A compound as in claim 1 wherein $R^1$ is phenoxymethyl, $R^2$ and $R^3$ each is methyl and X is chlorine.

4. A compound as in claim 1 wherein $R^1$ is benzyl, $R^2$ and $R^3$ each is methyl and X is chlorine.

5. A compound as in claim 1 wherein $R^1$ is α-carboxybenzyl, $R^2$ and $R^3$ each is methyl and X is chlorine.

6. A process for the production of a compound of claim 1 which comprises reacting a penicillin β-sulfoxide of the formula

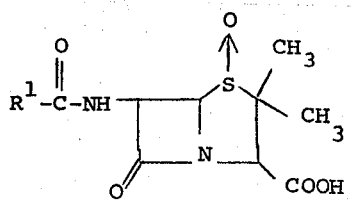

with a ketone of the formula

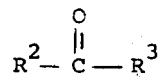

and an acyl halide of the formula RCOX, wherein R is lower alkyl, phenyl or phenyl-lower alkyl and $R^1$, $R^2$, $R^3$ and X have the same meaning as in claim 1.

* * * * *